United States Patent [19]

Joswig et al.

[11] Patent Number: 4,994,561

[45] Date of Patent: Feb. 19, 1991

[54] PROCESS FOR THE PREPARATION OF METALLIZABLE AZO DYES CARRYING OUT COUPLING IN AN INERT GAS ATMOSPHERE IN THE PRESENCE OF AN AMMONIUM SALT

[75] Inventors: Hans P. Joswig, Grenzach-Wyhlen; Werner Huber, Schwörstadt, both of Fed. Rep. of Germany

[73] Assignee: Ciba-Geigy Corporation, Ardsley, N.Y.

[21] Appl. No.: 536,054

[22] Filed: Jun. 8, 1990

Related U.S. Application Data

[63] Continuation of Ser. No. 280,062, Dec. 5, 1988, abandoned.

[30] Foreign Application Priority Data

Dec. 7, 1987 [CH] Switzerland .................. 4757/87

[51] Int. Cl.$^5$ .................. C09B 41/00; C09B 45/16; C09B 45/20; C09B 63/00
[52] U.S. Cl. .................. 534/582; 534/602; 534/583; 534/887; 534/573
[58] Field of Search .................. 534/582, 602, 583

[56] References Cited

U.S. PATENT DOCUMENTS 2,812,321  11/1957  Eberhart et al. .................. 260/141

FOREIGN PATENT DOCUMENTS

| 0187621 | 7/1986 | European Pat. Off. ............ 534/583 |
| 3808817 | 9/1988 | Fed. Rep. of Germany ...... 534/583 |
| 61-254550 | 11/1986 | Japan .................. 534/583 |
| 648364 | 1/1951 | United Kingdom .................. 534/583 |

OTHER PUBLICATIONS

Coloranti Azoici, Editura Technica Bucuresti (1981), 330-331.
Chem. Abstract 106:178104g (1987), Mitsui.

*Primary Examiner*—Floyd D. Higel
*Attorney, Agent, or Firm*—George R. Dohmann; Kevin T. Mansfield

[57] ABSTRACT

A process for the preparation of an azo dye of formula

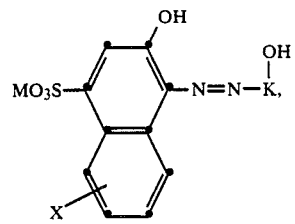

(1)

wherein K is the β-naphthol radical, X is hydrogen or nitro and M is an alkali metal ion or an ammonium ion, which process comprises coupling an aqueous solution containing 15 to 30 percent by weight of a diazo component of formula

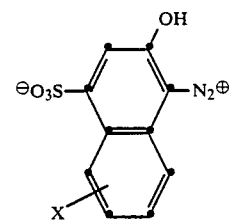

(2)

and 6 to 20 mol % of an ammonium salt, based on the molar amount of the diazo component, at a pH in the range from 10.5 to 11.5 and in an inert gas atmosphere, to a coupling component of formula

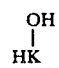

(3)

in which formulae (2) and (3) above K and X are as defined for formula (1).

The present invention makes it possible to obtain the claimed azo dyes in high yield.

13 Claims, No Drawings

PROCESS FOR THE PREPARATION OF METALLIZABLE AZO DYES CARRYING OUT COUPLING IN AN INERT GAS ATMOSPHERE IN THE PRESENCE OF AN AMMONIUM SALT

This application is a continuation of application Ser. No. 280,062, filed 12/5/88, now abandoned.

The coupling of 1-diazo-2-hydroxynaphthalene-4-sulfonic acid, or of the corresponding component containing a nitro group, to a coupling component of the benzene, naphthalene or heterocyclic series which contains a hydroxy group adjacent to the coupling site, proceeds in some cases slowly and in unsatisfactory yield.

In recent years, increasing efforts have been made to automate and optimise processes for the preparation of dyes or their intermediates, both as regards the synthesis and the working up. To obtain satisfactory results, the dye manufacturer is dependent on processes to which the following criteria apply: as quantitative a yield as possible, reproducibly good quality, reactions with as few working up steps as possible, and fast reactions that permit a high number of reactions per unit of time.

It has now been found that these objectives can be achieved by means of the process of this invention.

The process of this invention for the preparation of azo dyes of formula

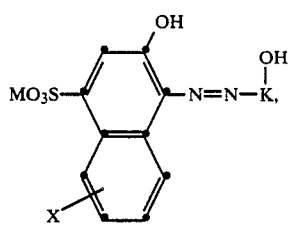
(1)

wherein K is the β-naphthol radical, X is hydrogen or nitro and M is an alkali metal ion or an ammonium ion, comprises coupling an aqueous solution containing 15 to 30 percent by weight of a diazo component of formula

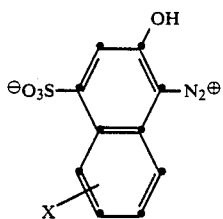
(2)

and 6 to 20 mol % of an ammonium salt, based on the molar amount of the diazo component, at a pH in the range from 10.5 to 11.5 and in an inert gas atmosphere, to a coupling component of formula

(3)

in which formulae (2) and (3) above K and X are as defined for formula (1).

Coupling compounds of formula (2) to compounds of formula (3) is known to be difficult. Attempts have therefore been made to improve the yield by using different catalysts, for example in the presence of zinc salts or in the presence of calcium or magnesium salts, or by coupling a highly concentrated solution of the diazo component of formula (2) in the presence of ammonium sulfate and under nitrogen. Zinc salts improve the yield, as do also calcium and magnesium salts. A drawback is the troublesome salt content after completion of the reaction, which usually makes it necessary to effect intermediate precipitation of the resultant azo dye. Carrying out the reaction under nitrogen in the presence of a highly concentrated solution of ammonium sulfate frequently results in the formation of a no longer stirrable reaction mass and thus in a drastic diminution of the yield.

It is surprising that the process of this invention affords a marked increase in yield, that the azo dyes obtained can be further processed direct without first being precipitated, and that the reaction is almost fully complete even after a very short time. Further, the process avoids pollution of the wastewater by heavy metal salts or sparingly soluble salts.

The amount in which the ammonium salt can be used in the process of this invention may vary within the limits of 6 to 20 mol %, preferably from 12 to 16 mol %, based on the molar amount of the diazo component of formula (2).

The ammonium salt which may suitably be used in the process of this invention is ammonium chloride or ammonium sulfate.

Nitrogen is preferably used as inert gas in the process of the invention.

The coupling of the compound of formula (2) to the compound of formula (3) is carried out in aqueous solution. The pH for the coupling is conveniently in the range from 10.5 to 11.5. The acidic diazo component of formula (2) is preferably first adjusted with an alkali metal hydroxide to ca. pH 6 and, after running in the alkaline solution of the coupling component, the pH of the coupling mixture is adjusted to a value in the range from 10.5 to 11.5, preferably to ca. 11. This adjustment is conveniently made with aqueous sodium hydroxide solution, preferably a 30 to 60% aqueous solution.

A preferred embodiment of the process of the invention comprises adjusting the pH to ca. 11.

A further preferred embodiment of the process of the invention comprises carrying out the coupling in the temperature range from 27° to 40° C, more particularly from 30° to 35° C and, most preferably, from 32° to 34° C.

A particularly preferred embodiment of the process of the invention comprises adding ammonium sulfate, conveniently in an amount of 12 to 16 mol %, preferably 15 to 16 mol %, based on the molar amount of the diazo component, to the compound of formula (2), adjusting the solution to ca. pH 6 and, under nitrogen, running in as rapidly as possible, at a temperature of 32° to 34° C, a solution of the coupling component of formula (3) which has been adjusted with alkali to a pH of above 12.

The molar ratio of diazo component of formula (2) to the coupling component of formula (3) is 1:1.40 to 1:1.1, preferably from 1:1.15 to 1:1.2.

A further preferred embodiment of the process of the invention comprises carrying out the coupling adiabatically, an initial temperature of at least 30° C being especially advantageous.

When the coupling is complete, the azo dye of formula (1) can be further processed direct, for example by metallising to a metal complex dye, without additional purification. If it is desired to isolate the dye of formula (1), it is convenient to heat the coupling mixture briefly, for example to a temperature in the range from 60° to 90° C, whereby a readily filterable form of the coupling product is obtained.

The diazo components of formula (2) which can be used in the process of this invention are preferably 1-diazo-2-hydroxynaphthalene-4-sulfonic acid and 1-diazo-6-nitro-2-hydroxynaphthalene-4-sulfonic acid. The diazo components of formula (2) are known and are prepared by known methods.

The coupling component of formula (3) is known and is prepared by known methods.

A particularly interesting embodiment of the process of this invention comprises treating an aqueous solution containing 24% by weight of 1-diazo-2-hydroxynaphthalene-4-sulfonic acid with 16 mol % of ammonium sulfate, adjusting the solution with NaOH to pH 6 before the coupling, and then running in as rapidly as possible, under nitrogen and at a temperature of 32° to 34° C, a solution of β-naphthol which has been adjusted with alkali to a pH of above 12. The coupling takes place under adiabatic conditions and is complete after ca. 3 hours. The azo dye can be further processed direct without isolation or can be isolated by filtration after heating briefly to 70° to 80° C.

The azo dyes obtained by the process of this invention are suitable for the preparation of metal complex dyes, for example chromium or cobalt complex azo dyes, wherein metallising is carried out by methods which are known per se.

In the following Examples, parts are by weight. The relationship between parts by weight and parts by volume is the same as that between the gram and the cubic centimetre.

EXAMPLE 1

137.5 parts of 1-diazo-2-hydroxynaphthalene-4-sulfonic acid are added to 440 parts of water and the pH is adjusted to 6 by addition of 48 parts of a 50% solution of sodium hydroxide. The temperature is brought to 35° C by addition of ca. 50 parts of ice. Then 11.7 parts of ammonium sulfate are added and the reactor is kept closed under nitrogen. To the resultant diazo suspension is added, under nitrogen, a solution containing 220 parts of water. 27.5 parts of sodium hydroxide and 92.5 parts of β-naphthol. The pH of the solution of the coupling component is higher than 12. The temperature of the coupling reaction is 32°-34° C. The pH is kept for 3 hours at 11.0 by addition of ca. 5 parts of sodium hydroxide solution. When the coupling is complete, no further nitrogen blanketing is necessary. Upon completion of coupling. 100 parts of water are added and the pH is adjusted to 4.5 with ca. 75 parts of 38% hydrochloric acid. The dye is salted out by addition of a 5 vol. % solution of sodium chloride, isolated by filtration and dried. The yield is ca. 99% of theory.

The use of an equimolar amount of 1-diazo-6-nitro-2-hydroxynaphthalene-4-sulfonic acid instead of 1-diazo-2-hydroxynaphthalene-4-sulfonic acid gives a dye in similarly high yield after a comparably short residence time in the coupling reactor.

The dyes so obtained can be further processed direct to the metal complex, without being first precipitated or without purification.

EXAMPLES 2-5

The procedure described in Example 1 is repeated, replacing 11.7 parts of ammonium sulfate by the amounts indicated in the Table 1 below. The same dye is obtained in comparably good yield.

TABLE 1

| Examples | Parts of ammonium sulfate |
| --- | --- |
| 2 | 5 parts |
| 3 | 9.4 parts |
| 4 | 11.2 parts |
| 5 | 13 parts |

What is claimed is:

1. A process for the preparation of an azo dye of formula

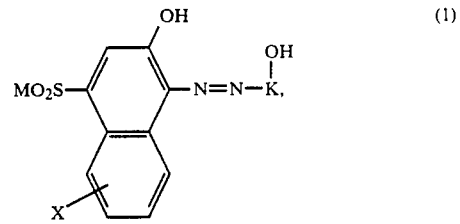

wherein K is the β-naphthol radical, X is hydrogen or nitro and M is an alkali metal ion or an ammonium ion, which process comprises coupling an aqueous solution containing 15 to 30 percent by weight of a diazo component of formula

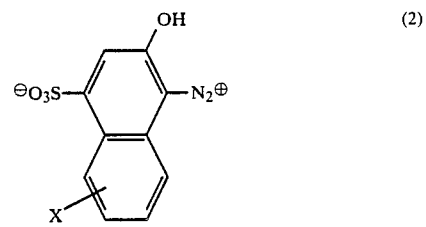

and 6 to 20 mol % of an ammonium salt, based on the molar amount of the diazo component, at a pH in the range from 10.5 to 11.5, a temperature from 32° to 34° C and in an inert gas atmosphere, to a coupling component of formula

in which formulae (2) and (3) above K and X are as defined for formula (1).

2. A process according to claim 1, wherein the coupling is carried out in the presence of ammonium sulfate or ammonium chloride.

3. A process according to claim 1, wherein the coupling is carried out in the presence of 12 to 16 mol % of ammonium sulfate.

4. A process according to claim 1, wherein the coupling is carried out at a pH of 11.0

5. A process according to claim 3, wherein the coupling is carried out in the presence of 15 to 16 mol % of ammonium sulfate.

6. A process according to claim 1, wherein the pH is adjusted to a value from 5.5 to 7.0 immediately before the coupling of the solution or suspension containing the diazo component and ammonium sulfate.

7. A process according to claim 6, wherein the pH is adjusted to a value of 6, immediately before the coupling of the solution or suspension containing the diazo component and ammonium sulfate.

8. A process according to claim 1, wherein ammonium sulfate in an amount of 12 to 16 mol %, based on the molar amount of the diazo component, is added to the compound of formula (2), the solution is adjusted to pH 6 and a solution of the coupling component of formula (3), which has been adjusted to a pH of above 12, is run in as rapidly as possible.

9. A process according to claim 1, wherein the coupling is carried out adiabatically.

10. A process according to claim 1, which comprises the use of a diazo component of formula (2) in which X is hydrogen.

11. A process according to claim 1, wherein the coupling is carried out under nitrogen.

12. A process according to claim 1, wherein an aqueous solution containing 24% by weight of 1-diazo-2-hydroxynaphthalene-4-sulfonic acid and 16 mol % of ammonium sulfate is adjusted to pH 6 with NaOH before the coupling and then a solution of β-naphthol, which is adjusted to a pH of above 12, is run in as rapidly as possible.

13. A process of claim 1 wherein an aqueous solution containing 15 to 20 percent by weight of a diazo component of formula (2) is utilized.

* * * * *